(12) United States Patent
Hudman (10) Patent No.: US 11,526,036 B2
(45) Date of Patent: Dec. 13, 2022

(54) VARIABLE OPTICAL CORRECTION USING SPATIALLY VARYING POLARIZERS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 130 days.

(21) Appl. No.: 17/167,934

(22) Filed: Feb. 4, 2021

(65) Prior Publication Data

US 2021/0247631 A1 Aug. 12, 2021

Related U.S. Application Data

(60) Provisional application No. 62/971,182, filed on Feb. 6, 2020.

(51) Int. Cl.
*G02F 1/01* (2006.01)
*G02F 1/139* (2006.01)
(Continued)

(52) U.S. Cl.
CPC ....... *G02F 1/0136* (2013.01); *G02B 27/0172* (2013.01); *G02B 27/0179* (2013.01);
(Continued)

(58) Field of Classification Search
CPC .................................................. G02F 1/0136
See application file for complete search history.

(56) References Cited

U.S. PATENT DOCUMENTS 6,982,773 B2 1/2006 Kurtz et al.
7,160,017 B2 1/2007 Lee et al.
(Continued)

OTHER PUBLICATIONS

International Search Report and Written Opinion, dated Apr. 20, 2021, for International Application No. PCT/US2021/016640, 8 pages.
(Continued)

*Primary Examiner* — Edmond C Lau
(74) *Attorney, Agent, or Firm* — Seed Intellectual Property Law Group LLP (57) ABSTRACT

An optical system is provided that includes a correction portion including one or more spatially varying polarizers. A first spatially varying polarizer of the one or more spatially varying polarizers has a first control input configured to receive a first control signal indicating whether the first spatially varying polarizer is to be active or inactive. When active, the first spatially varying polarizer is operative to provide a first optical correction on light passing through the correction portion. The optical system includes a controller configured to determine whether to implement the first optical correction on the light passing through the correction portion and in response to determining to implement the first optical correction on the light passing through the correction portion, output the first control signal indicating the first spatially varying polarizer is to be active. Additional spatially varying polarizers may be controlled to provide additional or alternative optical corrections.

18 Claims, 5 Drawing Sheets

(51) Int. Cl.
*G02B 27/01* (2006.01)
*G02F 1/133* (2006.01)

(52) U.S. Cl.
CPC ........ *G02F 1/1396* (2013.01); *G02F 1/13306* (2013.01); *G02B 2027/0187* (2013.01)

(56) References Cited

U.S. PATENT DOCUMENTS

| | | |
|---|---|---|
| 7,295,312 B1 | 11/2007 | Gerhart et al. |
| 8,004,675 B2 | 8/2011 | Lefaudeux |
| 8,235,533 B2 | 8/2012 | Hudman et al. |
| 8,368,889 B2 | 2/2013 | Schwiegerling et al. |
| 8,982,313 B2 | 3/2015 | Escuti et al. |
| 9,298,041 B2 | 3/2016 | Escuti et al. |
| 9,335,586 B2 | 5/2016 | Escuti et al. |
| 9,410,677 B2 | 8/2016 | Wheatley et al. |
| 10,203,489 B2 | 2/2019 | Khan et al. |
| 2011/0032483 A1 | 2/2011 | Hruska et al. |
| 2011/0310220 A1 | 12/2011 | McEldowney |
| 2013/0027656 A1 | 1/2013 | Escuti et al. |
| 2013/0286479 A1 | 10/2013 | Sung et al. |
| 2015/0079302 A1 | 3/2015 | Du et al. |
| 2015/0131311 A1 | 5/2015 | Wheatley et al. |
| 2016/0182889 A1 | 6/2016 | Olmstead |
| 2016/0349516 A1 | 12/2016 | Alexander et al. |
| 2019/0243147 A1 | 8/2019 | Smithwick et al. |
| 2019/0318677 A1 | 10/2019 | Lu et al. |
| 2019/0377183 A1 | 12/2019 | Sharp |
| 2020/0301147 A1 | 9/2020 | Klug |
| 2020/0310067 A1* | 10/2020 | Levin ................ G02B 27/281 |
| 2021/0003848 A1* | 1/2021 | Choi .................... G06V 40/19 |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.

Hornburg et al., "Wide color gamut multi-twist retarders," Proc. of SPIE, Emerging Liquid Crystal Technologies X, vol. 9384, 93840W, 2015, 11 pages.

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komanduri et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

* cited by examiner

VARIABLE OPTICAL CORRECTION USING SPATIALLY VARYING POLARIZERS

BACKGROUND

Technical Field

The present disclosure relates to an optical correction system performing variable optical correction using spatially varying polarizers.

Description of the Related Art

Head-mounted display devices (HMDs) are display devices, worn on the head of a user, having one or more display units for presenting visual content to a user. HMDs are becoming increasingly popular to provide virtual reality (VR) or augmented reality (AR) experiences, or to facilitate gaming or presentation of audiovisual media. The display units are typically miniaturized and may include CRT, LCD, Liquid crystal on silicon (LCos), or OLED technologies, for example. Some HMDs are binocular and have the potential to display a different image to each eye. This capability is used to display stereoscopic images to present a more immersive user experience.

Existing HMDs do not account for a user's vision defects or deficiencies. For instance, persons with astigmatism, myopia, or hyperopia (also known as Presbyopia) may wear glasses to correct one or more of these conditions. However, previously-implemented HMDs display visual content to users without adapting virtual image light to correct for these conditions. At least some HMDs do not have sufficient space in front of or around a user's eyes to allow the user to wear vision correction glasses and the HMD. As a result, the visual content may appear unfocused or unclear to a user afflicted with defects or deficiencies in vision who wear glasses, detracting from the user's overall experience.

BRIEF SUMMARY

A head-mounted display may be summarized as including a virtual image display unit and an optical system for modifying virtual image light. The optical system may modify virtual image light to enhance user experience or viewing or correct for one or more vision conditions of the user including myopia, hyperopia, and astigmatism. The optical system may include a left optical subsystem and a right optical subsystem that are respectively operable to modify virtual image light received from the virtual image display to correct left eye and right eye viewing.

The optical system includes one or more spatially varying polarizers that are each operable to be in an active (on) state or an inactive (off) state based on controller input. A spatially varying polarizer may be formed of a multi-twist retarder (MTR) and customized to provide precise levels of retardation in a single thin film. The spatially varying polarizer may be configured to operate as a correction optic and cause light passing therethrough to undergo refraction (according to a refractive index) or diffraction (according to a diffraction pattern). The spatially varying polarizer may be formed as a polarization-directed lens and have electrically-controllable focal length for focusing passing light and may perform collimation on the passing light.

Each spatially varying polarizer may be formed to have diffraction pattern properties, light collimation properties, light focusing properties or aberration correction properties, among others, that operate on light passing through the spatially varying polarizer. A subset of two or more spatially varying polarizers may in combination have specific diffraction properties, light collimation properties, light focusing properties or aberration correction properties, among others, that operate on light passing through the subset.

The controller may switch individual spatially varying polarizers, subsets of the spatially varying polarizers or all available spatially varying polarizers on or off to realize and implement corresponding optical corrections. The controller may switch various spatially varying polarizers between on and off states to switch between different available optical corrections.

An optical system may be summarized as including: a correction portion including one or more spatially varying polarizers, a first spatially varying polarizer of the one or more spatially varying polarizers having a first control input configured to receive a first control signal indicating whether the first spatially varying polarizer is to be active or inactive, the first spatially varying polarizer, when active, being operative to provide a first optical correction on light passing through the correction portion; and a controller configured to: determine whether to implement the first optical correction on the light passing through the correction portion; and in response to determining to implement the first optical correction on the light passing through the correction portion, output the first control signal indicating the first spatially varying polarizer is to be active.

The one or more spatially varying polarizers may include a second spatially varying polarizer in a stacked arrangement with the first spatially varying polarizer such that the light passing through the correction portion impinges on the second spatially varying polarizer after having passed through the first spatially varying polarizer. The second spatially varying polarizer may have a second control input configured to receive a second control signal indicating whether the second spatially varying polarizer is to be active or inactive, and wherein the second spatially varying polarizer, when active, may be operative to provide a second optical correction on the light passing through the correction portion. The controller may be configured to: determine to implement the second optical correction on the light passing through the correction portion; and in response to determining to implement the second optical correction on the light passing through the correction portion, output the first control signal indicating the first spatially varying polarizer is to be inactive; and output the second control signal indicating the second spatially varying polarizer is to be active. The one or more spatially varying polarizers may include a third spatially varying polarizer in a stacked arrangement with the first and second spatially varying polarizers such that the light passing through the correction portion impinges on the third spatially varying polarizer after having passed through the first and second spatially varying polarizers. The third spatially varying polarizer may have a third control input configured to receive a third control signal indicating whether the third spatially varying polarizer is to be active or inactive, and wherein the third spatially varying polarizer, when active, may be operative to provide a third optical correction on the light passing through the correction portion. The controller may be configured to: determine to implement the third optical correction on the light passing through the correction portion; and in response to determining to implement the third optical correction on the light passing through the correction portion, output the first control signal indicating the first spatially varying polarizer is to be inactive; output the second control signal indicating the second spatially varying polarizer is to be inactive; and output the third control signal indicating the third spatially varying polarizer is to be active. Providing the first optical correction on the light passing through the correction portion may include performing diffraction according to a diffraction pattern, light collimation, light focusing or aberration correction. The one or more spatially varying polarizers may include a multi-twist retarder (MTR).

A head-mounted display system may be summarized as including: a support structure; a display; an optical system comprising first and second optical subsystems, each of the first and second optical subsystems comprising: a correction portion including one or more spatially varying polarizers, a first spatially varying polarizer of the one or more spatially varying polarizers having a first control input configured to receive a first control signal indicating whether the first spatially varying polarizer is to be active or inactive, the first spatially varying polarizer, when active, being operative to provide a first optical correction on light passing through the correction portion; and a controller configured to, for each of the first and second optical subsystems: determine whether to implement the first optical correction on the light passing through the correction portion; and in response to determining to implement the first optical correction on the light passing through the correction portion, output the first control signal indicating the first spatially varying polarizer is to be active.

For each of the first and second optical subsystems, the one or more spatially varying polarizers may include a second spatially varying polarizer in a stacked arrangement with the first spatially varying polarizer such that the light passing through the correction portion impinges on the second spatially varying polarizer after having passed through the first spatially varying polarizer. For each of the first and second optical subsystems, the second spatially varying polarizer may have a second control input configured to receive a second control signal indicating whether the second spatially varying polarizer is to be active or inactive, and wherein the second spatially varying polarizer, when active, may be operative to provide a second optical correction on the light passing through the correction portion. For each of the first and second optical subsystems, the controller may be configured to: determine to implement the second optical correction on the light passing through the correction portion; and in response to determining to implement the second optical correction on the light passing through the correction portion, output the first control signal indicating the first spatially varying polarizer is to be inactive; and output the second control signal indicating the second spatially varying polarizer is to be active.

For each of the first and second optical subsystems, the one or more spatially varying polarizers may include a third spatially varying polarizer in a stacked arrangement with the first and second spatially varying polarizers such that the light passing through the correction portion may impinge on the third spatially varying polarizer after having passed through the first and second spatially varying polarizers. For each of the first and second optical subsystems, the third spatially varying polarizer may have a third control input configured to receive a third control signal indicating whether the third spatially varying polarizer is to be active or inactive, and wherein the third spatially varying polarizer, when active, may be operative to provide a third optical correction on the light passing through the correction portion. For each of the first and second optical subsystems, the controller may be configured to: determine to implement the third optical correction on the light passing through the correction portion; and in response to determining to implement the third optical correction on the light passing through the correction portion, output the first control signal indicating the first spatially varying polarizer is to be inactive; output the second control signal indicating the second spatially varying polarizer is to be inactive; and output the third control signal indicating the third spatially varying polarizer is to be active. For each of the first and second optical subsystems, providing the first optical correction on the light passing through the correction portion may include performing diffraction according to a diffraction pattern, light collimation, light focusing or aberration correction. For each of the first and second optical subsystems, the one or more spatially varying polarizers may include a multi-twist retarder (MTR).

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts). References to the term "set" (e.g., "a set of items"), as used herein, unless otherwise noted or contradicted by context, is to be construed as a nonempty collection comprising one or more members or instances.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
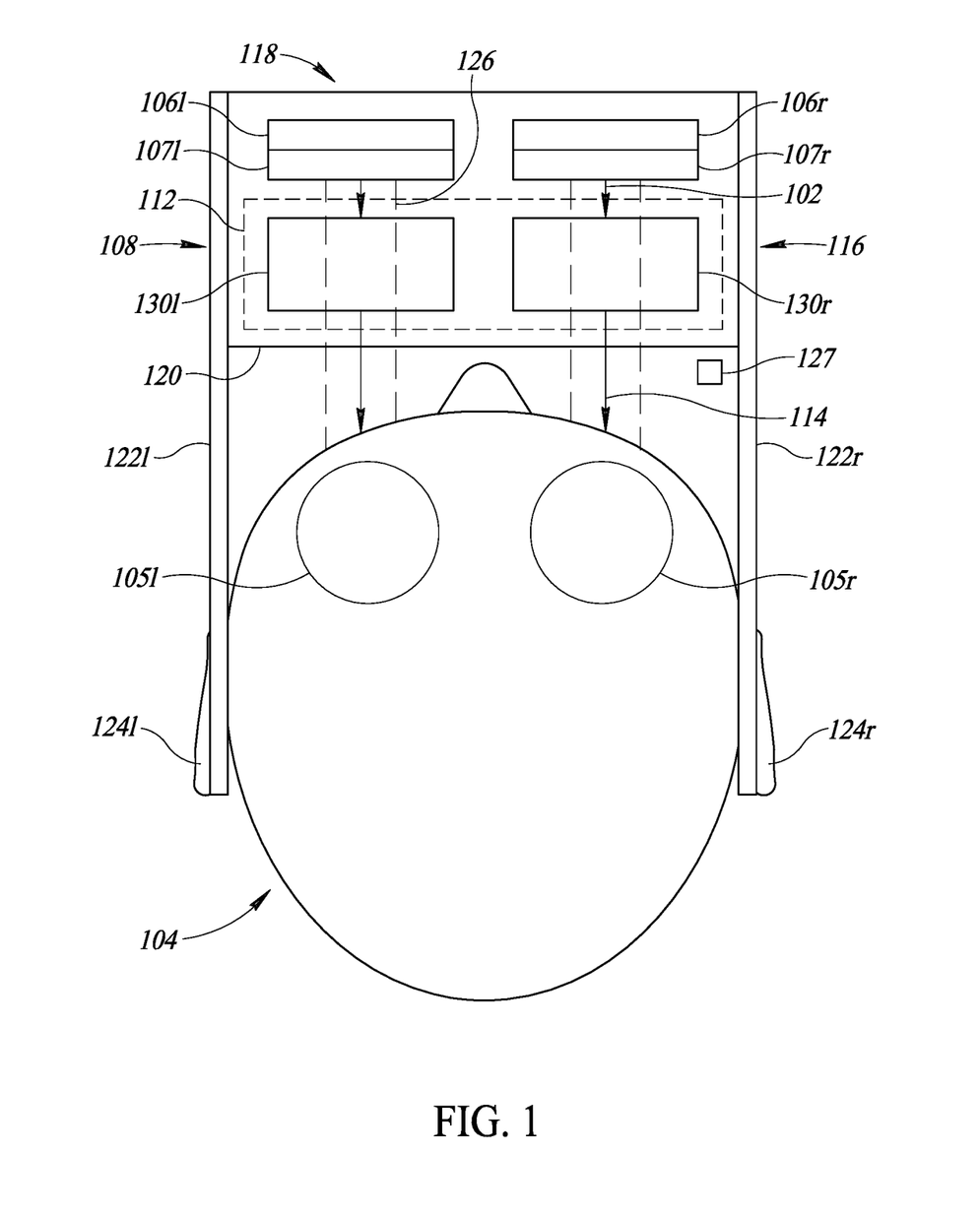
FIG. 1 shows an overhead plan view of a head-mounted display having an optical system according to one or more implementations.

FIG. 1 shows an overhead plan view of a head-mounted display device (HMD) 100 according to one or more embodiments. The HMD 100 is configured to present a virtual reality (VR) to a user 104, such as via corresponding video presented at a display rate such as 30 frames (or images) per second or 90 frames per second, while other embodiments of a similar system may present an augmented reality display to the user 104. The HMD 100 provides corrected virtual image light 102 to a left eye 105*l* and a right eye 105*r* of a user 104. The HMD 100 includes one or more virtual image display units 106 mounted to or within a frame 108. The virtual image display units 106 generate virtual image light 102 for causing the user to perceive visual content. The HMD 100 may further include left and right sets of lenses 107*l* and 107*r* provided on an emission side of the virtual image display units 106. The left and right sets of lenses 107*l* and 107*r* may focus, collimate, or otherwise modify the virtual image light 102 after it is emitted from the virtual image display units 106. The left and right sets of lenses 107*l* and 107*r* may include, for example, Fresnel lenses that refract or collimate the virtual image light 102.

The HMD 100 also includes an optical system 112 that has optical characteristics that are selectively variable for correcting for one or more vision conditions of the user. For instance, the optical system 112 is selectively adjustable to correct for one or more of myopia, hyperopia, and astigmatism, among others. The virtual image light 102 emitted from the virtual image display units 106 travels along an optical path 126 through the optical system 112, which modifies the virtual image light 102 according to the optical characteristics of the optical system 112 and emits corrected virtual image light 114 to the left and right eyes 105*l* and 105*r*, respectively, of the user.

The frame 108 is a mounting structure for supporting the HMD 100 on the head of the user 104. The frame 108 includes a main body 116 having a front portion 118 and a viewing portion 120 opposite to the front portion 118 for positioning in front of the user's eyes 105*l* and 105*r* to view the visual content generated. The HMD 100 includes one or more support structures for selectively mounting the HMD 100 to the user's head. For instance, the HMD 100 of FIG. 1 includes left and right temples 122*l* and 122*r* for respectively resting over the left and right ears 124*l* and 124*r* of the user 104. In some embodiments, the HMD 100 may include another support structure, such as a strap connected to the main body 116 that wraps around the back of the head of the user 104. A nose assembly (not shown) of the HMD 100 may support the main body 116 on the nose of the user 104. The frame 108 may be shaped and sized to position the optical system 112 in front of one of the user's eyes 105*l* and 105*r*. Although the frame 108 is shown in a simplified manner similar to eyeglasses for explanatory purposes, it should be appreciated that in practice more sophisticated structures (e.g., goggles, integrated headband, helmet, straps, etc.) may be used to support and position the HMD 100 on the head of the user 104.

The virtual image display units 106 generate the virtual image light 102 that is transmitted through and selectively modified by the optical system 112. The virtual image display units 106 include a left display unit 106*l* for generating image light for presentation to the left eye 105*l* and a right display unit 106*r* for generating image light for presentation to the right eye 105*r*. The virtual image display units 106 may include liquid crystal displays (LCDs), light emitting diodes (LEDs), cathode ray tubes (CRTs), liquid crystal on silicon (LCos), or other light emitting technologies that generate the virtual image light 102. The virtual image display units 106 of the embodiment shown in FIG. 1 are located in a front portion of the HMD 100 and emit light in a rearward direction toward the eyes of the user 104. In some embodiments, the virtual image display units 106 may include waveguides that direct (e.g., reflect, refract) the virtual image light 102 toward the eyes 105*l* or 105*r* such that the light emitting elements of the virtual image display units 106 are not directly in front of the eyes 105*l* and 105*r* for the user 104 for perceiving the visual content. In some embodiments, the front portion 118 of the main body 116 may be at least partially transparent such that the user 104 may perceive external content for providing an augmented reality experience.

The HMD 100 includes a gaze tracker 127 configured to track a gaze (or direction thereof) of the user 104 or the user's eyes 105*l*, 105*r*. Although the gaze tracker 127 is shown as an internal element of the HMD 100, the gaze tracker 127 may in alternative embodiments be an external sensor. Further, the gaze tracker 127 may perform gaze or pupil tracking separately for each eye 105*l* and 105*r* or track a location or orientation of the user's 104 head (e.g., as part of head tracking). Further, the gaze tracker 127 may track various other types of movements and position of the user's body.

The gaze tracker 127 may output data representative of a gaze of the user 104. The data may indicate a position (or a region) on the viewing portion 120 where the user 104 is directing his gaze. The position (or region) may be a center of the viewing portion 120, a quadrant of the viewing portion 120 or any other region of the viewing portion 120.

While the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

The virtual image light 102 may comprise a plurality of light rays that travel from each of the virtual image display units 106 along an optical path 126 through the optical system 112 and toward the viewing portion 120. The optical system 112 modifies some or all of the plurality of light rays to provide the corrected virtual image light 114. The optical system 112 includes one or more optical subsystems 130 for modifying the virtual image light 102. Although a plurality of optical subsystems 130 including a left optical subsystem 130*l* for modifying the virtual image light 102 for the left eye 105*l* and a right optical subsystem 130*r* for modifying the virtual image light 102 for the right eye 105*r*, one optical subsystem 130 may be used to collectively modify the virtual image light 102 for both eyes 105*l*, 105*r*. Each of the left and right optical subsystems 130*l* and 130*r* may be independently adjustable to enhance a viewing experience of a user 104 or correct for visual deficiencies or defects in the left eye 105*l* and the right eye 105*r*, respectively.

Figure 2:
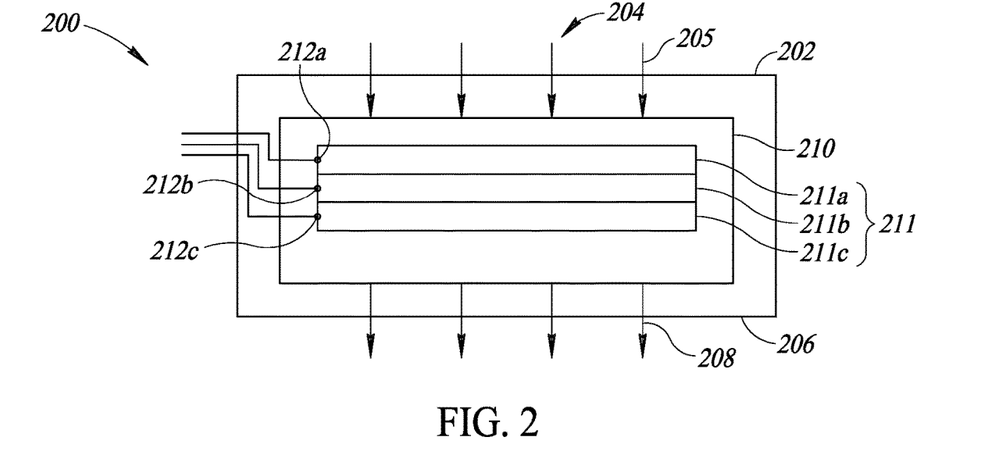
FIG. 2 shows a diagram of an optical subsystem of the optical system of the head-mounted display of FIG. 1.

FIG. 2 shows a diagram 200 of the optical subsystem 130 (e.g., optical subsystem 130*l* or 130*r*) of FIG. 1 according to one or more embodiments. The optical subsystem 130 includes a receiving portion 202 for receiving initial virtual image light 204 corresponding to the virtual image light 102 for a single eye, and an emitting portion 206 for emitting a corrected virtual image light 208. The initial virtual image light 204 may comprise a plurality of light rays 205 each having a particular set of attributes (e.g., color, direction, luminance) for causing the user 104 to perceive the visual content. The optical subsystem 130 further comprises a correction portion 210 that includes one or more spatially varying polarizers 211 as described herein. The correction portion 210 corrects the initial virtual image light 204 and emits the corrected virtual image light 208.

Although three spatially varying polarizers 211 (a first, second and third spatially varying polarizer 211*a*, 211*b*, 211*c*) are shown in FIG. 2, the optical subsystem 130 may include any number of spatially varying polarizers 211.

Each spatially varying polarizers 211*a*, 211*b*, 211*c* has a respective input 212*a*, 212*b*, 212*c* operable to receive a respective control signal indicative of whether the spatially varying polarizer 211*a*, 211*b*, 211*c* is to be on or off. The control signal may have a first state indicating that a spatially varying polarizer 211 is to be on and a second state indicating that the spatially varying polarizer 211 is to be off. The inputs 212 may be coupled to a controller described herein (not shown in FIG. 2) and the control signals may be received from the controller.

The spatially varying polarizers 211 may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

A spatially varying polarizer 211 may comprise a wave retarder that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

A spatially varying polarizer 211 may be configured to operate as a correction optic. The birefringent material of the spatially varying polarizer 211 may be configured to cause light passing therethrough to undergo refraction (for example, according to a refractive index). Each spatially varying polarizer 211 may have a diffraction pattern. The spatially varying polarizer 211 may be formed as a polarization-directed lens and have electrically-controllable focal length. Further, the spatially varying polarizer 211 may perform collimation on passing light.

The one or more spatially varying polarizers 211 of the correction portion 210 may individually, collectively or in subsets operate as an electrically-controlled correction optic. Each spatially varying polarizer 211 may be formed to have diffraction pattern properties, light collimation properties, light focusing properties or aberration correction properties, among others, that operate on light passing through the spatially varying polarizer 211. Furthermore, a subset of two or more spatially varying polarizers 211 of the available spatially varying polarizers 211 may in combination have specific diffraction properties, light collimation properties, light focusing properties or aberration correction properties, among others, that operate on light passing through the subset. When the subset is activated (or switched on) and other available spatially varying polarizers 211 are deactivated (or switched off), the subset may operate on light passing therethrough according to the specific properties of the subset.

Each spatially varying polarizer 211*a*, 211*b*, 211*c* may be formed to perform specific optical correction as an optic. In addition or as an alternative, two or more spatially varying polarizers 211 may be formed to perform specific optical correction as an optic in combination. The spatially varying polarizers 211*a*, 211*b*, 211*c* may be layered or stacked with the plurality of light rays 205 passing from the first spatially varying polarizer 211*a* to the second spatially varying polarizer 211*b* and then to the third spatially varying polarizer 211*c*. The first spatially varying polarizer 211*a* and second spatially varying polarizer 211*b* are each formed to collectively to perform the desired optical correction. The first spatially varying polarizer 211*a* may be formed to perform a first optical correction on light 205 impinging on the first spatially varying polarizer 211*a*. The second spatially varying polarizer 211*b* may be formed to perform a second optical correction on light impinging on the second spatially varying polarizer 211*b* (after having been corrected by the first optical correction). The combination of the first and second optical correction collectively achieves the desired optical correction.

Continuing with the example, the third spatially varying polarizer 211*c* may be turned off such that it does not impede or interfere with the desired optical correction performed by the first and second spatially varying polarizer 211*a*, 211*b*. When turned off, the third spatially varying polarizer 211*c* may not perform optical correction of its own. Alternatively, when turned off, the third spatially varying polarizer 211*c* may perform a third optical correction. In this case, the first and second optical correction may be adjusted so as to compensate for the third optical correction (and reverse the effect of the third optical correction) so as to achieve the sought optical correction.

Figure 3:
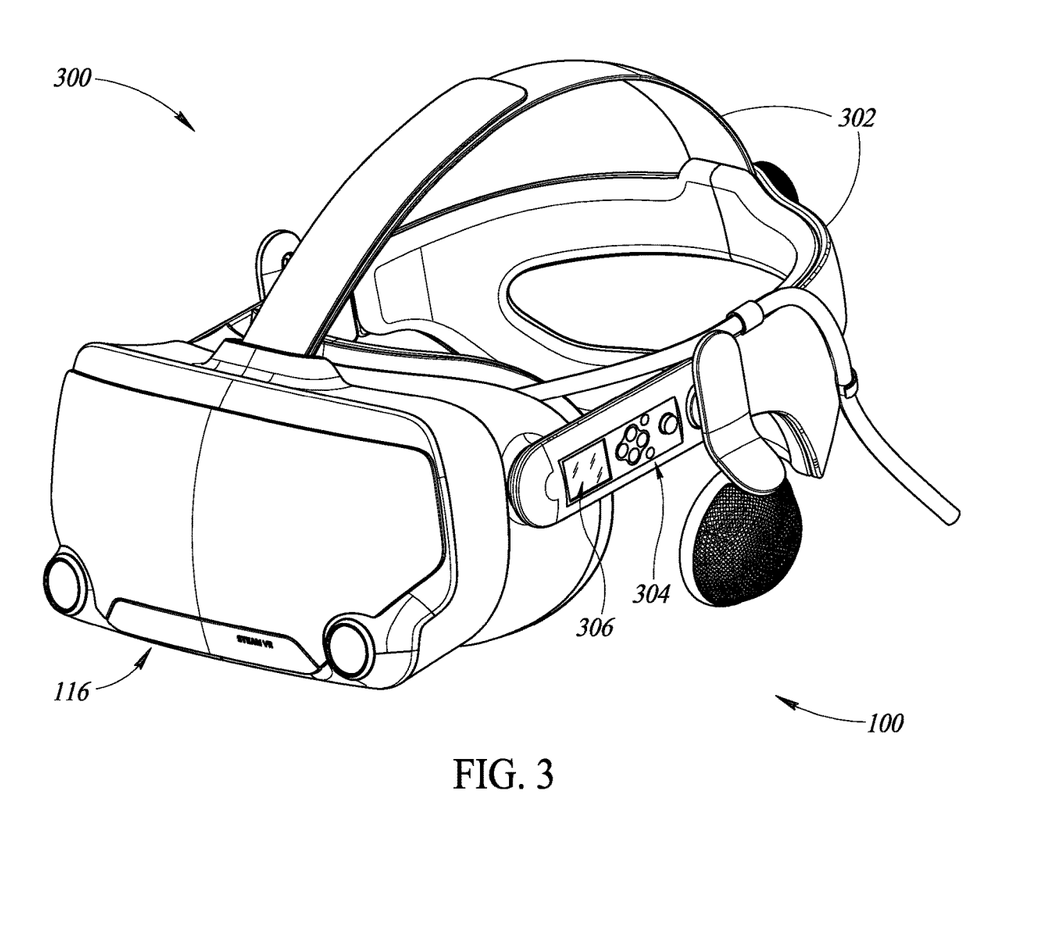
FIG. 3 shows an overhead perspective view of an exterior of the head-mounted display of FIG. 1.

FIG. 3 shows an exterior 300 of the HMD 100 according to one or more embodiments. The HMD 100 includes a set of straps 302 attached to the main body 116. The set of straps 302 are usable to selectively and securely mount the HMD 100 to the head of the user 104 for viewing visual content. The main body 116 may include a control panel 304 for controlling various aspects of the HMD 100. The control panel 304 may include one or more input devices for controlling optical characteristics of the optical system 112 to correct the visual content. The visual content may be corrected to improve an experience of the user 104 and/or for vision conditions (e.g., myopia, hyperopia, astigmatism) of the user 104.

The input devices may be electrical devices that are electrically coupled to a controller and configured to command the controller to configure the optical correction performed by the correction portion 210 and one or more spatially varying polarizers 211 thereof. As an example, the input devices may, in response to interaction by the user 104, cause an electrical signal to be sent to the controller that, in response, sends one or more control signals to respective spatially varying polarizers 211a, 211b, 211c to adjust the optical correction performed by the correction portion 210. Non-limiting examples of an electrical input device of the control panel 304 include a keypad having a set of keys for providing alphanumeric input or navigating a menu, or a dial or knob that is electrically coupled to the controller. The exterior 300 may include a display 306 for displaying information regarding the HMD 100, such as current optical settings of the optical system 112. In some embodiments, the display 306 may be a touchscreen input device that the user 104 may interact with to control the optical system 112.

In some embodiments, the user may adjust the optical settings of the optical system 112 in connection with visual content presented by the virtual image display unit(s) 106. For instance, the user wearing the HMD 100 may interact with the control panel 304 or other input device (e.g., hand-held controller, mouse, keyboard) according to a menu or other visual content displayed by the virtual image display unit(s) 106 to adjust the optical settings. As one example, the user may navigate a menu via the control panel 304 or other input device and provide user input that causes the optical settings of the optical system 112 to be changed in response. As another example, the HMD 100 may adjust the optical settings of the optical system 112 in real-time in response to user input regarding visual content perceived by the user 104. The user may initiate a visual test on the HMD 100 causing the virtual image display unit(s) 106 to display visual content, such as test patterns, and prompting the user to provide input regarding clarity of the visual content. As a result of receiving the input, the HMD 100 may automatically adjust the optical settings of the optical system 112 for improving the clarity of the visual content to improve the user's 104 experience.

Figure 4:
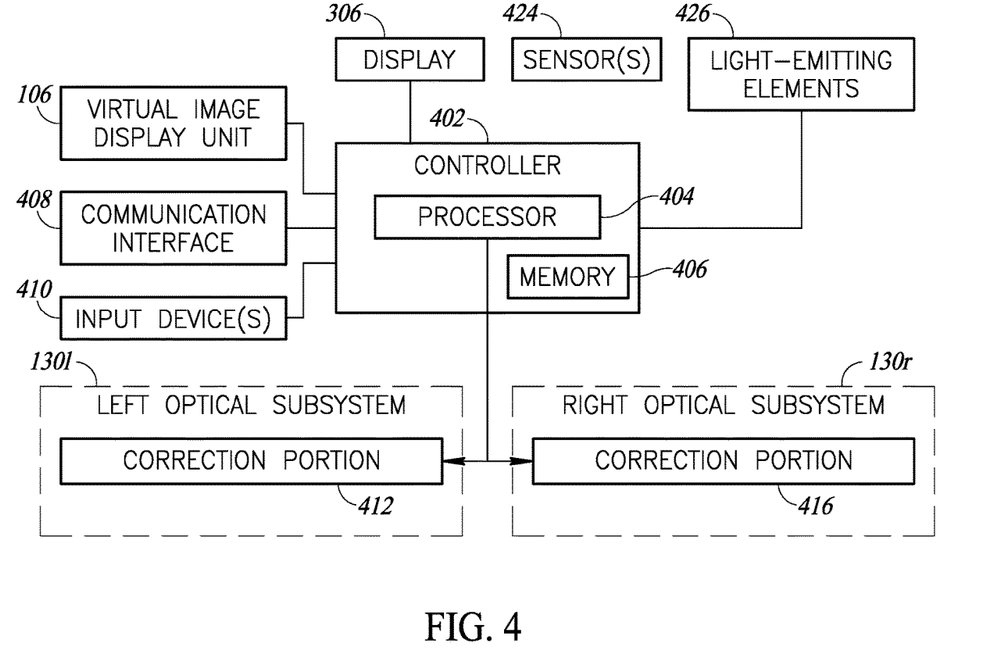
FIG. 4 shows a schematic block diagram of the head-mounted display.

FIG. 4 is a block diagram 400 showing interconnections of various parts of the HMD 100 according to one or more embodiments. The HMD 100 includes a controller 402 comprising one or more processors 404 and memory 406 storing a set of instructions that, as a result of execution by the one or more processors 404, cause the HMD 100 to perform one or more operations described herein. The memory 406 may include read-only memory (ROM) and random access memory (RAM) and may be in the form of solid-state memory or a hard disk drive, by way of non-limiting illustrative example. The HMD 100 also includes a communication interface 408 electrically coupled to the controller 402 for sending and receiving communications with external devices. The communication interface 408 may include one or more wireless transceivers, such as Wi-Fi transceivers, cellular transceivers, Bluetooth™ transceivers, etc., that wirelessly send and receive communications to and from external devices, such as a network router or a computing device (e.g., laptop, desktop, tablet, mobile device). The communication interface 408 may include a wired communication port, such as a universal serial bus port, a network interface port, or the like, for wired communication with external devices.

The HMD 100 may include a set of input devices 410 electrically coupled to the controller 402 for providing user input to the HMD 100. One or more of the set of input devices 410 may be provided on the exterior 300 of the HMD 100—for example, as part of the control panel 304. The controller 402 may also be electrically coupled to and configured to control the virtual image display units 106 and/or the display 306 if included. In some embodiments, the controller 402 may include one or more graphics processing units for generating the virtual image light 102 via the virtual image display units 106.

The controller 402 is electrically coupled to the optical system 112 and configured to control the optical system 112 for adjusting the optical characteristics thereof, as described herein. In particular, the controller 402 is electrically coupled to and configured to control a correction portion 412 of the left optical subsystem 130l, and a correction portion 416 of the right optical subsystem 130r.

Each correction portion 412, 416 may be configured as described with reference to FIG. 2 herein. The controller 402 is electrically coupled to the correction portions 412, 416 to control respective spatially varying polarizers 211 thereof. Specifically, the controller 402 sends signals (e.g., control signals) to the correction portions 412, 416 causing the respective correction portions 412, 416 to perform optical correction by switching on and off spatially varying polarizers 211 thereof. As described above, the correction portions 412, 416 may be controlled to modify optical characteristics thereof. The controller 402 may send signals in response to receiving an input. For instance, the controller 402 may cause the optical characteristics to be adjusted in response to receiving an input from the input device(s) 410. As another example, the controller 402 may adjust the optical characteristics in response to receiving an input via the communication interface 408.

The input received by the controller 402 may have a particular format. The input may indicate a prescription for the right eye and/or a prescription for the left eye. For each respective eye, the input may indicate a refractive or spherical power (sometimes denoted as SPH or S), a cylinder power (sometimes denoted as CYL or C), and/or an axis (usually between 0 and 180). The input may include input for the left optical subsystem 130l and the right optical subsystem 130r.

Adjustment of the optical settings of the optical subsystem 112 may be adjusted in real-time through feedback provided by the user 104. The controller 402 may initiate a test to determine adjustments to make to the optical settings of the optical system 112. The test may involve causing the virtual image display unit(s) 106 to display particular visual content, such as a test pattern or a detailed visual image, and prompting the user to provide feedback via the input device(s) 410 or the control panel 304. The user 104 may provide feedback indicating that aspects (e.g., text, images) of the visual content appear unclear. The controller 402 may adjust the optical settings of the optical system 112 and ask the user 104 whether the adjustments improved clarity of the aspects of the visual content. This process may be iterative and repeated until the user 104 is satisfied with the clarity of the visual content. The test may be performed in response to receiving user input from a user 104 via an input device 410 or the control panel 304.

Input over the communication interface 408 may be provided by a device (e.g., laptop, desktop, mobile device, controller) as a result of user interaction. The computing device may include a set of instructions (e.g., application, program) that the user can interact with to cause the computing device to send communications including information indicating or representative of optical characteristics for modifying the virtual image light 102 to correct for the user's 104 vision conditions. The user may enter the input into the input device 410 or the computing device as a prescription provided by a medical professional and may have a predetermined format, as described above.

The controller 402 may, in response to receiving the input from the input device(s) 410 or the communication interface 408, determine signals to send to the correction portions 412, 416. One or more of the processors 404, for example, may access a data structure stored in the memory 406 indicating control signals to be sent to corresponding correction portions 412, 416. The data structure may be an array, lookup table, or other referential structure in which input data is associated with the corresponding output (i.e., control signal) to be sent. In some implementations, the controller 402 may store information in the memory 406 indicating a current state of the optical system 112 from which the controller 402 may determine adjustments to satisfy the input received.

In an embodiment, the spatially varying polarizers 211 may be formed with advanced knowledge of a prescription or medical condition of the user 104 or a set of potential users of the HMD 100 and may be tailored to the user 104 or the set of potential users. In this case, the HMD 100 may be customized for the user 104 or the set of potential users, which may be friends of the user or members of the user's household. For example, each spatially varying polarizer 211 may be formed to optically correct for a particular user of the potential set of users. During use, the controller 402 may switch to a particular spatially varying polarizer 211 depending on the identity of the user of the HMD 100.

The spatially varying polarizers 211 may be formed to provide optical correction within a range of a present prescription of the user. If the vision of the user changes or degrades over time, the controller 402 of the HMD 100 customized for the user 104 may adjust the optical correction within the range to fine tune the optical correction and provide optical correction more suitable to the user's changed prescription. The changeability of the optical correction provided by the correction portions 412, 416 described herein enables adapting the optical correction to new, foreseen or predictable optical correction needs.

In some embodiments, the HMD 100 may be configured to detect vision conditions of the user's eyes 105*l* and 105*r* and automatically adjust the optical system 112 as a result of the detection. In such embodiments, the HMD 100 may include one or more sensors 424 that detect information regarding the user's eyes 105*l* and 105*r* and provides measurements to the controller 402, which adjusts the optical system 112 accordingly. The HMD 100 may also include one or more lighting elements 426 coupled to the controller 402 for use in connection with the sensor(s) 424 for obtaining information. The light emitting element(s) 426 may emit light at an angle and having certain characteristics (e.g., frequency, intensity) such that the light is reflected and received by the sensor(s) 424. The sensor(s) 424 may determine, based on the light detected from the user's eye, information about the user's eyes. As a result of the information determined regarding the user's 104 eyes, the controller 402 may adjust the optical characteristics of the optical system 112 accordingly.

Figure 5:
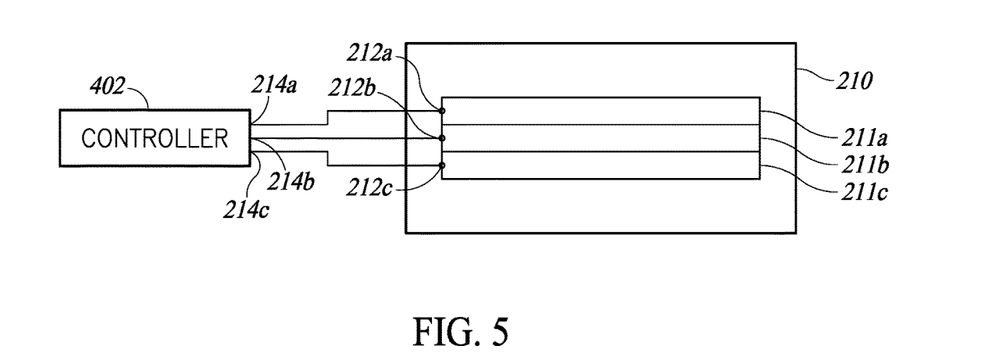
FIG. 5 shows a correction portion coupled to the controller described with reference to FIG. 4.

FIG. 5 shows the correction portion 210 coupled to the controller 402 described with reference to FIG. 4. The controller 402 has a plurality of outputs 214*a*, 214*b*, 214*c* respectively coupled to the plurality of inputs 212*a*, 212*b*, 212*c* of the respective plurality of spatially varying polarizers 211*a*, 211*b*, 211*c*. In the illustrated example, three layers of spatially varying polarizers are shown for explanatory purposes, but in application fewer layers (e.g., 1 layer, 2 layers) or more layers (e.g., 5 layers, 10 layers, 20 layers, etc.) may be used as desired. The controller 402 sends over each output 214 a control signal operative to cause the spatially varying polarizers 211 to become active or inactive.

When inactive, the spatially varying polarizers 211, the spatially varying polarizer 211 may be optically clear or may only perform inherent optical correction associated with the material composition of the spatially varying polarizer 211. Materials of various types have optical properties and are operative to change light. As described herein, the spatially varying polarizer 211 may be formed of two or more twisted liquid crystal layers. The liquid crystal layers of the spatially varying polarizer 211 when turned off may still perform inherent optical correct. When turned on, the spatially varying polarizer 211 performs the optical correction it has been designed to perform.

The first, second and third spatially varying polarizers 211*a*, 211*b*, 211*c* are formed to perform first, second and third optical corrections. In operation, the controller 402 sends controls signals to the spatially varying polarizers 211*a*, 211*b*, 211*c* to operate the spatially varying polarizers 211*a*, 211*b*, 211*c* between active and inactive states. For example, to activate the first optical correction and deactivate the second and third optical corrections, the controller 402 sends a control signal to the first spatially varying polarizer 211*a* that activates the first spatially varying polarizer 211*a* and sends respective control signals to the second and third spatially varying polarizers 211*b*, 211*c* that respectively deactivate the second and third spatially varying polarizers 211*b*, 211*c*. The first optical correction may be a combination of sought optical correction and optical compensation. The optical compensation may compensate for inherent optical correction performed by the deactivated second and third spatially varying polarizers 211*b*, 211*c*. Light leaving the first spatially varying polarizer 211*a* and traversing the deactivated second and third spatially varying polarizers 211*b*, 211*c* is thus pre-compensated for the inherent optical correction performed by the deactivated second and third spatially varying polarizers 211*b*, 211*c*.

In another example, the controller 402 may send a control signal to the first spatially varying polarizer 211*a* that deactivates the first spatially varying polarizer 211*a* and may send respective control signals to the second and third spatially varying polarizers 211*b*, 211*c* to activate the second and third spatially varying polarizers 211*b*, 211*c*. The first optical correction provided by the second and third spatially varying polarizers 211*b*, 211*c* is a combination of the second and third optical corrections. The controller 402 may selectively switch the spatially varying polarizers 211 between active and inactive states to cause the correction portion 210 provide optical correction.

Figure 6:
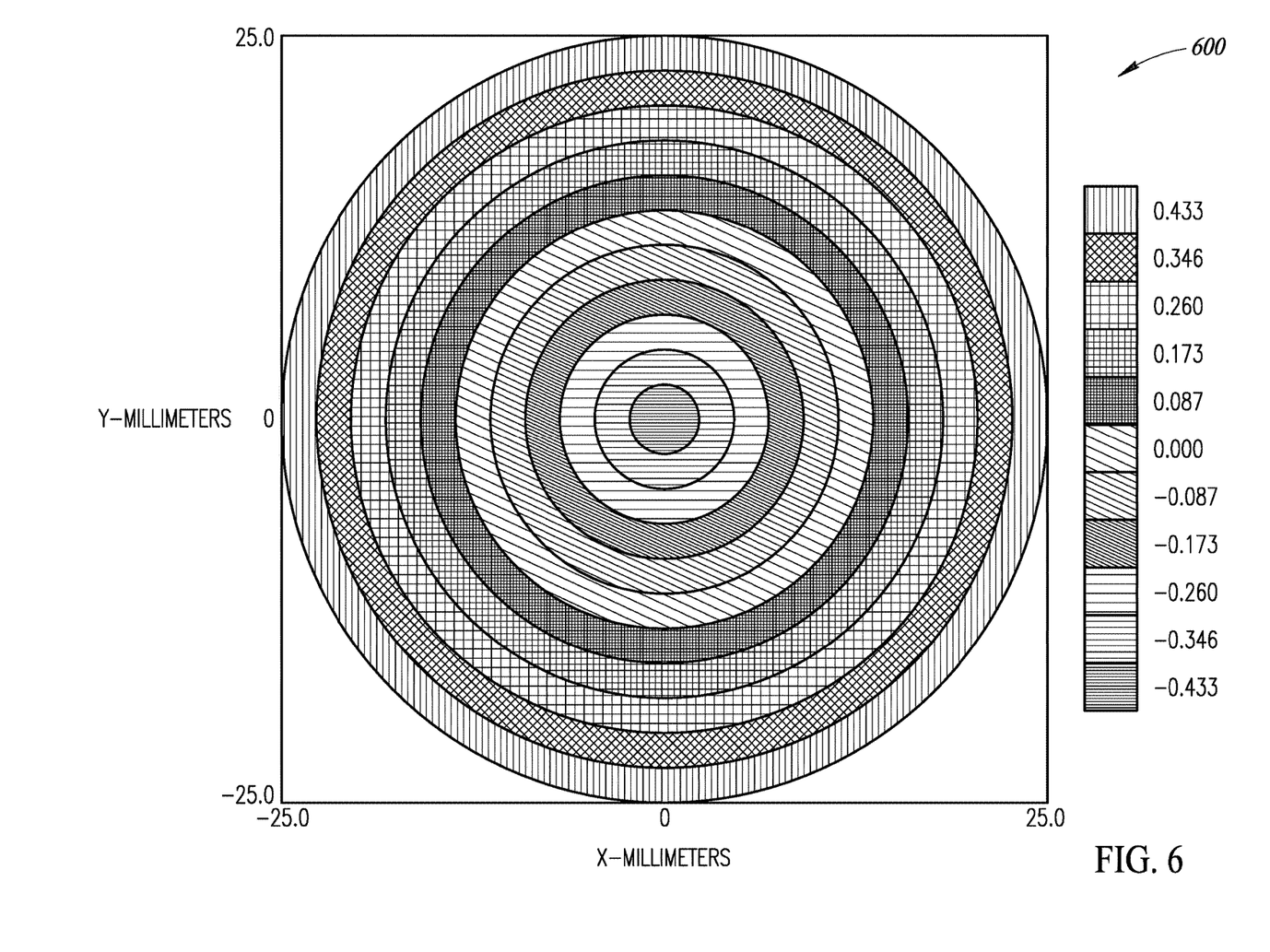
FIG. 6 is an example surface phase map for a spatially varying polarizer, according to one non-limiting illustrated implementation.
Figure 7:
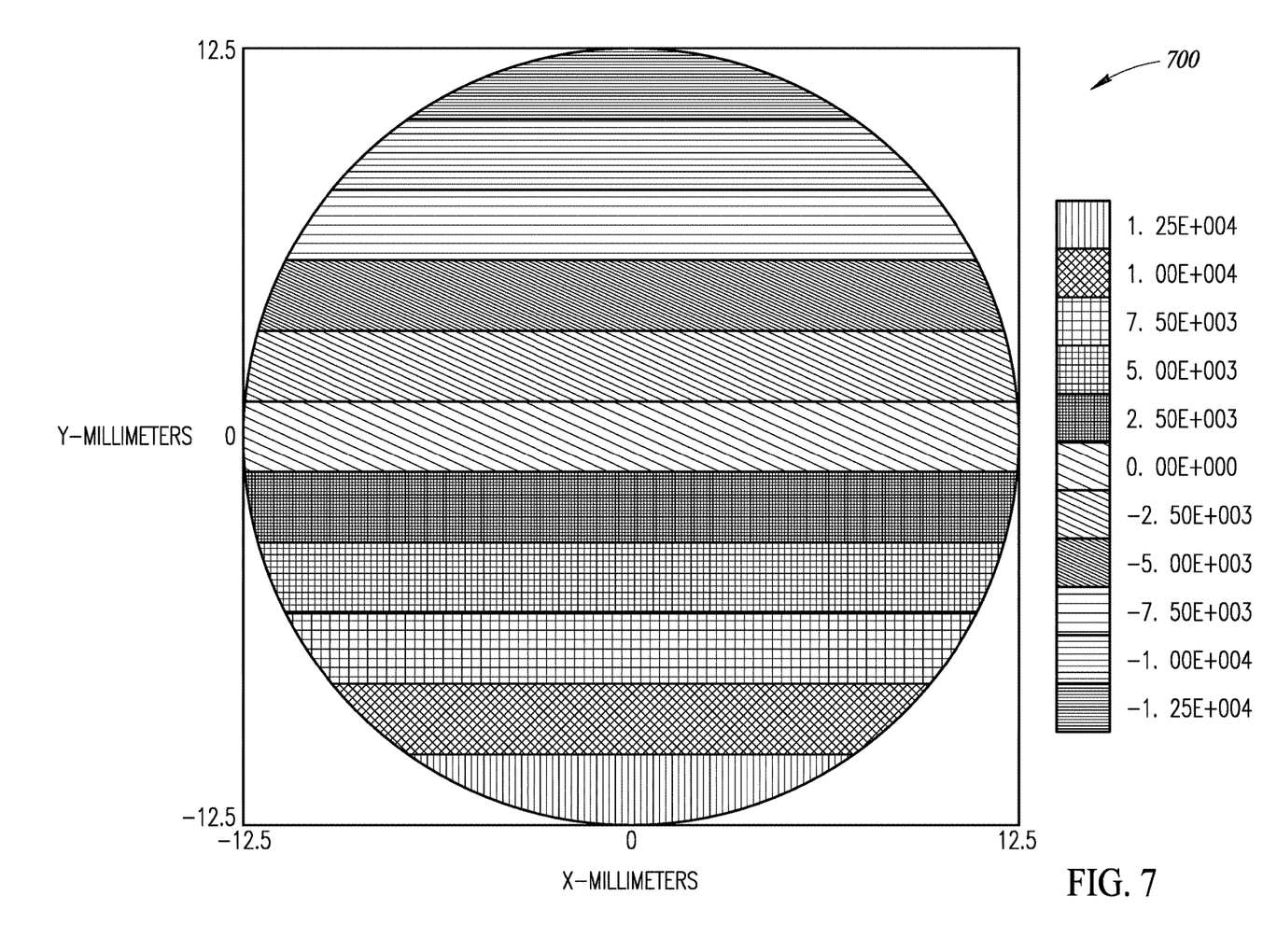
FIG. 7 is another example surface phase map for spatially varying polarizer, according to one non-limiting illustrated implementation.

The spatially varying polarizers of the present disclosure may provide spatially varying polarization defined by a surface phase map, or by a combination of two or more surface phase maps multiplexed together. More generally, any linear or non-linear function may be used to define the surface of one or more of the spatially varying polarizers of the present disclosure to provide the desired functionality. FIGS. 6 and 7 show two non-limiting examples of surface phase maps for the spatially varying polarizers. In the example surface map 600 of FIG. 6, the phase is varied concentrically from the center of the optic toward the outer periphery between −0.433 wavelengths to +0.433 wavelengths. In the example surface map 700 of FIG. 7, the phase is varied linearly from −1.25E+004 at the bottom (as shown) of the optic to +1.25E+004 at the top (as shown) of the optic, wherein the units are periods of 2π radians each. In application, two or more spatially varying polarizers may be stacked together. For instance, the concentric surface phase map 600 may be multiplexed with the linear phase map 700, etc. It is noted that although the phase variance of the surface maps 600 and 700 are shown as discrete steps for simplicity, in practice the phase may be continuously variable across the surface of the optic. Further, the particular phase values in the surface phase maps 600 and 700 are provided as examples, and should not be considered limiting.

In at least some implementations, the surface phase map of a spatially varying polarizer may be designed to offset or compensate for undesirable polarization caused by at least one other component of the display system, such as a display source, lens, etc. In such implementations, a phase profile or map of the optical system (e.g., the lens, or the lens and the display source) may first be determined. The determined phase map may then be inverted and applied to the spatially varying polarizer, such that the spatially varying polarizer offsets or compensates for the undesirable effects caused by other components of the optical system.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical system, comprising:
a correction portion including one or more spatially varying polarizers, a first spatially varying polarizer of the one or more spatially varying polarizers having a first control input configured to receive a first control signal indicating whether the first spatially varying polarizer is to be active or inactive, the first spatially varying polarizer, when active, being operative to provide a first optical correction on light passing through the correction portion; and
a controller configured to:
determine whether to implement the first optical correction on the light passing through the correction portion; and
in response to determining to implement the first optical correction on the light passing through the correction portion, output the first control signal indicating the first spatially varying polarizer is to be active.

2. The optical system of claim 1, wherein the one or more spatially varying polarizers include a second spatially varying polarizer in a stacked arrangement with the first spatially varying polarizer such that the light passing through the correction portion impinges on the second spatially varying polarizer after having passed through the first spatially varying polarizer.

3. The optical system of claim 2, wherein the second spatially varying polarizer has a second control input configured to receive a second control signal indicating whether the second spatially varying polarizer is to be active or inactive, and wherein the second spatially varying polarizer, when active, is operative to provide a second optical correction on the light passing through the correction portion.

4. The optical system of claim 3, wherein the controller is configured to:
determine to implement the second optical correction on the light passing through the correction portion; and
in response to determining to implement the second optical correction on the light passing through the correction portion,
output the first control signal indicating the first spatially varying polarizer is to be inactive; and
output the second control signal indicating the second spatially varying polarizer is to be active.

5. The optical system of claim 3, wherein the one or more spatially varying polarizers include a third spatially varying polarizer in a stacked arrangement with the first and second spatially varying polarizers such that the light passing through the correction portion impinges on the third spatially varying polarizer after having passed through the first and second spatially varying polarizers.

6. The optical system of claim 5, wherein the third spatially varying polarizer has a third control input configured to receive a third control signal indicating whether the third spatially varying polarizer is to be active or inactive, and wherein the third spatially varying polarizer, when active, is operative to provide a third optical correction on the light passing through the correction portion.

7. The optical system of claim 6, wherein the controller is configured to:
determine to implement the third optical correction on the light passing through the correction portion; and
in response to determining to implement the third optical correction on the light passing through the correction portion,
output the first control signal indicating the first spatially varying polarizer is to be inactive;
output the second control signal indicating the second spatially varying polarizer is to be inactive; and
output the third control signal indicating the third spatially varying polarizer is to be active.

8. The optical system of claim 1, wherein providing the first optical correction on the light passing through the correction portion includes performing diffraction according to a diffraction pattern, light collimation, light focusing or aberration correction.

9. The optical system of claim 1, wherein the one or more spatially varying polarizers comprise a multi-twist retarder (MTR).

10. A head-mounted display system, comprising:
a support structure;
a display;
an optical system comprising first and second optical subsystems, each of the first and second optical subsystems comprising:
a correction portion including one or more spatially varying polarizers, a first spatially varying polarizer of the one or more spatially varying polarizers having a first control input configured to receive a first control signal indicating whether the first spatially varying polarizer is to be active or inactive, the first spatially varying polarizer, when active, being operative to provide a first optical correction on light passing through the correction portion; and
a controller configured to, for each of the first and second optical subsystems:
determine whether to implement the first optical correction on the light passing through the correction portion; and in response to determining to implement the first optical correction on the light passing through the correction portion, output the first control signal indicating the first spatially varying polarizer is to be active.

11. The head-mounted display system of claim 10, wherein, for each of the first and second optical subsystems, the one or more spatially varying polarizers include a second spatially varying polarizer in a stacked arrangement with the first spatially varying polarizer such that the light passing through the correction portion impinges on the second spatially varying polarizer after having passed through the first spatially varying polarizer.

12. The head-mounted display system of claim 11, wherein, for each of the first and second optical subsystems, the second spatially varying polarizer has a second control input configured to receive a second control signal indicating whether the second spatially varying polarizer is to be active or inactive, and wherein the second spatially varying polarizer, when active, is operative to provide a second optical correction on the light passing through the correction portion.

13. The head-mounted display system of claim 12, wherein, for each of the first and second optical subsystems, the controller is configured to:
determine to implement the second optical correction on the light passing through the correction portion; and
in response to determining to implement the second optical correction on the light passing through the correction portion,
output the first control signal indicating the first spatially varying polarizer is to be inactive; and
output the second control signal indicating the second spatially varying polarizer is to be active.

14. The head-mounted display system of claim 12, wherein, for each of the first and second optical subsystems, the one or more spatially varying polarizers include a third spatially varying polarizer in a stacked arrangement with the first and second spatially varying polarizers such that the light passing through the correction portion impinges on the third spatially varying polarizer after having passed through the first and second spatially varying polarizers.

15. The head-mounted display system of claim 14, wherein, for each of the first and second optical subsystems, the third spatially varying polarizer has a third control input configured to receive a third control signal indicating whether the third spatially varying polarizer is to be active or inactive, and wherein the third spatially varying polarizer, when active, is operative to provide a third optical correction on the light passing through the correction portion.

16. The head-mounted display system of claim 15, wherein, for each of the first and second optical subsystems, the controller is configured to:
determine to implement the third optical correction on the light passing through the correction portion; and
in response to determining to implement the third optical correction on the light passing through the correction portion,
output the first control signal indicating the first spatially varying polarizer is to be inactive;
output the second control signal indicating the second spatially varying polarizer is to be inactive; and
output the third control signal indicating the third spatially varying polarizer is to be active.

17. The head-mounted display system of claim 10, wherein, for each of the first and second optical subsystems, providing the first optical correction on the light passing through the correction portion includes performing diffraction according to a diffraction pattern, light collimation, light focusing or aberration correction.

18. The head-mounted display system of claim 10, wherein, for each of the first and second optical subsystems, the one or more spatially varying polarizers comprises a multi-twist retarder (MTR).

* * * * *